Dec. 10, 1935.     J. HARDING, JR     2,024,133
FUEL HANDLING UNIT
Original Filed July 19, 1930

INVENTOR
JOHN HARDING, JR.
BY
ATTORNEY

Patented Dec. 10, 1935

2,024,133

UNITED STATES PATENT OFFICE 2,024,133

FUEL HANDLING UNIT

John Harding, Jr., Seattle, Wash., assignor to Boeing Airplane Company, Seattle, Wash., a corporation of Washington Continuation of application Serial No. 469,054, July 19, 1930. This application July 27, 1932, Serial No. 625,111

15 Claims. (Cl. 103—5)

This application is a continuation of my application Serial No. 469,054, filed July 19, 1930.

This invention concerns devices for handling fuel in airplanes.

Various considerations are present in the handling of fuel in airplanes. The paramount consideration is the factor of safety. It has been customary to locate the various necessary units, such as the distributor valve controlling the fuel supply from the several tanks, the strainer, the hand pump for emergency operation and for priming, the power pump for normal operation, the relief valve for returning fuel in excess of that needed by the engine, and the by-pass valve which is brought into operation upon failure of the power pump to by-pass fuel from the hand pump to the carburetor, upon different parts of the airplane and as parts of independent units. These units are connected by piping, and because of the necessity of keeping weight to the minimum, for ease of installation and replacement, and for other reasons, this piping has usually been copper or aluminum tubing, the ends of which are expanded and held by coupling means to the several units. Because of the nature of these materials, it is of too frequent occurrence that the tubes crystallize or break from vibration, or from other causes, and that the connections become loose and fail. Obviously a failure in the supply of fuel brought about by such a failure within the system, is extremely serious. At the least, it will probably necessitate an immediate landing, and not infrequently such a failure will throw highly inflammable gasoline over the plane, cargo, passengers and/or the pilot, and cause a fire. Accordingly, it is of the utmost importance, for reasons of safety, to eliminate such tubing and connections in so far as this is possible. Naturally, the fuel tanks cannot be located immediately adjacent the motor, and the pilot must have at hand devices for controlling the fuel to draw first from one tank and then from another, to operate the hand pump when necessary, and the like. Consequently all tubing cannot be eliminated, but it is the object of my present invention to eliminate or reduce to a minimum the tubing interconnecting the several parts of the fuel handling system, and thus to reduce to the minimum the danger of breakage or leakage.

It is a further object to devise a fuel handling unit having the self-contained passages necessary to accomplish proper flow of the fuel, which can be located in the lowest part of the airplane, operable by remote control means, and which because of the collection of the several parts in one unit, and because of the elimination of numerous coupling means usually employed, can be made lighter than the sum of the several units with their connections.

A further objection to former fuel handling systems with their long lengths of tubing resided in the inevitable formation of air locks within the pump and the lines. These air locks were caused mainly on account of the power pump being located well above the level of the fuel tanks, but also by air entering the system when one supply tank runs dry, by highly volatile gasoline vaporizing within the fuel pump from heat and suction, due mostly to vaporization of gasoline when pumped through a gear pump. Such air locks cause malfunction of the carburetor, with resultant failure of the engine until the air escapes through the carburetor on systems which by-pass the excess supply back to the main line supply. Numerous forced landings have been caused by air locks, resulting in damage to the airplane because of the time required in exhausting the system of air through the carburetor as aforesaid. Certain of these units should be located below the level of the tanks, and it is an object of my invention, therefore, by so combining the several parts in one unit, properly designed, to eliminate the likelihood of such air locks, and to provide means whereby they can be quickly cleared through the use of the hand pump, the remote control of which is located conveniently to the pilot, and by locating the unit in relatively the lowest point of the fuel system, submerged at all times, thus eliminating the suction or lifting of fuel by either the hand or power pump.

My invention comprises the novel parts, and particularly the novel combination and arrangement of the parts thereof relative to each other, as shown in the accompanying drawing, as described in this specification, and as will be more particularly pointed out by the claims which terminate the same.

In the accompanying drawing I have shown my invention incorporated in a form which is illustrative of the principles of the invention, though it is to be understood that other forms may be adopted embodying these principles, within the scope of the claims.

Figure 2:
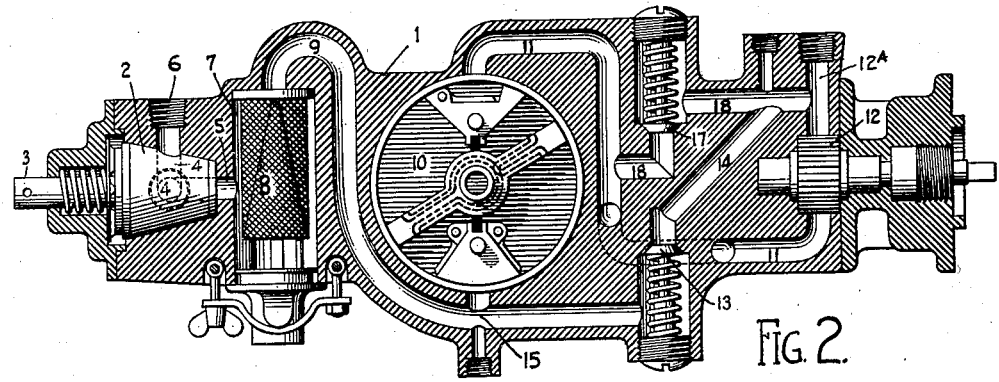
Figure 2 is a longitudinal sectional side elevation, taken on the line 2—2 of Figure 1.
Figure 1:
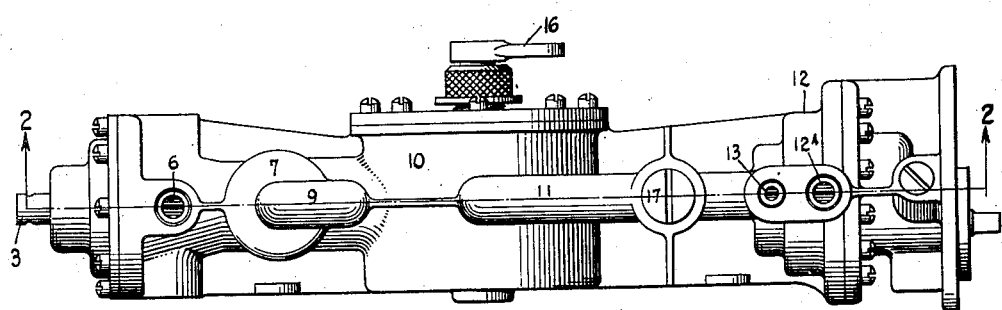
Figure 1 is a top plan view of my fuel handling unit.
Figure 4:
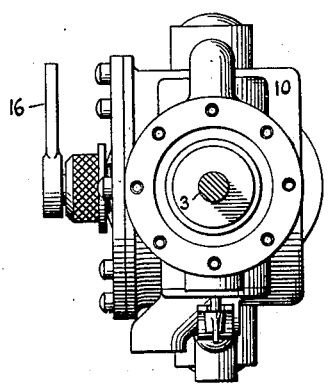
Figure 4 is an end view from the left hand side.
Figure 3:
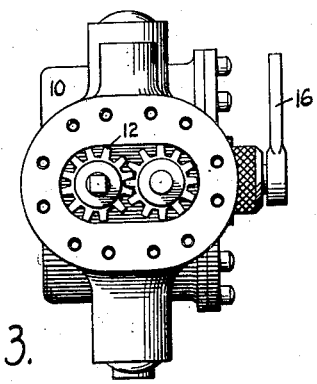
Figure 3 is an end view of Figure 1 from the right hand side.

The casing within which are contained the several necessary units may be formed as a casting 1 suitably shaped and recessed to accommodate the units which are to be incorporated within the same. These may be, by way of example, a distributor valve 2, a strainer 8, a hand pump 10, a power pump 12, a relief valve 13, and a by-pass valve 17.

The distributor valve 2 is formed with remote means to turn it into one of several positions at the will of the pilot. It is shown as having a shaft 3 to which any suitable control means may be secured for convenience in turning it. The body of the distributor valve is formed with a plurality of apertures 4 which interconnect with an outlet 5 formed as a cored passage within the casting 1. Any one of the apertures 4 can be brought into registry with intakes 6, likewise cored within the casting 1, to which are secured the tubes leading from the several supply tanks (not shown). The outlet 5 communicates with a chamber 7 within the casting 1, within which chamber is mounted a suitable strainer. From the strainer runs a duct 9, cored or otherwise formed within the casting 1, which communicates with the chamber within which is mounted the hand pump 10. The hand pump may be of any type which is found suitable.

In the normal operation of the fuel system, with the power pump 12 in operation, the gasoline passes through the hand pump, which is in the position shown, thence into a duct 11 which delivers it to a mechanically driven pump 12. From the pump 12 the gasoline is driven under pressure through an outlet 12A, and thence is delivered to the carburetor of the engine. Ordinarily it will be necessary to attach tubing to the several inlets 6 and to the outlet 12A, but other tubing is eliminated by the self-contained ducts.

The feeding capacity of the pump 12, and likewise of the pump 10, is greatly in excess of the amount of gasoline necessary for normal operation of the engine. Such excess supply is returned from the duct 12A through the self-contained duct 14, past the relief valve 13 into the duct 9, where the excess fuel rejoins the incoming supply in this latter duct 9, and the cycle is repeated, starting at a point indicated by the numeral 15.

In the event of failure of the power pump the hand pump 10 is manually operated by means of its handle 16. The flow of gasoline under pressure is continued from the pump 10 through the duct 11, and because it cannot pass the now inoperative power pump 12, the pressure developed unseats a by-pass valve 17 located in the duct 18, and through this duct 18 the gasoline reaches the discharge duct 12A, whence it passes to the carburetor, as before. Since excess fuel is pumped by the hand pump in the normal mode of operation, this excess fuel is directed to the relief duct 14, and thence back into the duct 9, following the same course as it did from the power pump.

Various changes may be effected in the unit which I have described, particularly such as are required to adapt the unit and the parts contained therein to the exigencies of installation within a particular airplane, but in general there is included, self-contained within the one casing and without the necessity of piping and connections, the pump means and the various valve means to control fluid handled through the pump means, whereby the fuel may be handled between the fuel supply source and the engine through the chambers and passages contained within the unitary casing.

What I claim as my invention is:

1. A fuel handling unit of the class described comprising a housing, a plurality of pumps arranged within said housing, the housing having a series of fluid conveying ducts interconnecting the pumps, by-pass and relief valves arranged within said ducts and between said pumps for directing fluid from either of said pumps back into the said ducts, the housing having a plurality of fluid inlets and a single outlet, and means for selectively admitting fluid from any of said inlets.

2. A fuel handling unit of the class described comprising a housing, a pair of pumps arranged within said housing, one of said pumps being adapted for manual operation and the other of of said pumps being adapted for mechanical operation, the housing having a series of fluid conveying ducts certain thereof interconnecting said pumps in series, said ducts extending beyond said pumps for communication with fuel inlets and a fuel outlet, a by-pass valve and a relief valve arranged within said ducts and between said pumps, the relief valve being adapted to direct excess pressure from either pump back to said ducts in advance of the manually actuated pump, said by-pass valve being arranged to direct fluid under pressure from said manually actuated pump to said outlet.

3. A fuel handling unit for airplanes, comprising a body chambered to define a hand pump chamber and a power pump chamber, a hand pump and a power pump each in its appropriate chamber, a fuel supply connection to said body and a fuel discharge connection therefrom, and ducts interconnecting the fuel supply connection, the pumps, and the fuel discharge connection for recirculation of fuel from either pump.

4. A fuel handling unit for airplanes, comprising a body chambered to define a hand pump chamber and a power pump chamber, a hand pump and a power pump each in its appropriate chamber, a fuel supply connection to said body and a fuel discharge connection therefrom, ducts in said body from the fuel supply connection to the discharge connection, and including the two pump chambers, and a check-valve controlled relief duct connecting the discharge connection with the supply connection.

5. A fuel handling unit for airplanes, comprising a body chambered to define a hand pump chamber and a power pump chamber, a hand pump and a power pump each in its appropriate chamber, a fuel supply connection to said body and a fuel discharge therefrom, and a main duct in said body from the fuel supply connection to the fuel discharge connection, running to the power pump through the hand pump.

6. A fuel handling unit for airplanes, comprising a body chambered to define a hand pump chamber and a power pump chamber, a hand pump and a power pump each in its appropriate chamber, a fuel supply connection to said body and a fuel discharge therefrom, a main duct in said body from the fuel supply connection to the fuel discharge connection, running to the power pump through the hand pump, and a valve-controlled by-pass connecting the main duct, beyond the hand pump, with the discharge connection beyond the power pump.

7. A fuel handling unit for airplanes, comprising a body chambered to define a hand pump chamber and a power pump chamber, a hand pump and a power pump each in its appropriate chamber, a fuel supply connection to said body and a fuel discharge therefrom, a main duct in said body from the fuel supply connection to the fuel discharge connection running to the power pump through the hand pump, and a valve-controlled relief duct in said body connecting and permitting flow from the discharge connection, beyond the power pump, to the supply connection, in advance of the hand pump.

8. A fuel handling unit for airplanes, comprising a body chambered to define a hand pump chamber and a power pump chamber, a hand pump and a power pump each in its appropriate chamber, a fuel supply connection to said body and a fuel discharge therefrom, a main duct in said body from the fuel supply connection to the fuel discharge connection, running to the power pump through the hand pump, a check-valve-controlled by-pass duct in said body connecting the main duct, beyond the hand pump, with and permitting flow to the discharge connection, beyond the power pump, and a check-valve-controlled relief duct in said body connecting and permitting flow from the discharge connection, beyond the power pump, to the main duct, in advance of the hand pump.

9. A fuel handling unit for airplanes, comprising a body chambered to define a hand pump chamber, a power pump chamber, a strainer chamber, and a distributor valve chamber, a hand pump, a power pump, a strainer, and a distributor valve each in its appropriate chamber, fuel supply connections to the distributor valve chamber, a fuel discharge connection from the body, beyond the power pump, a main duct in said body, in turn connecting the distributor valve, the strainer, the hand pump, and the power pump, a check-valve-controlled relief duct in the body connecting the discharge connection to the main duct, in advance of the hand pump, and a check-valve-controlled by-pass duct connecting the main duct, between the two pumps, with the discharge connection.

10. A fuel handling unit for airplanes, for interposition between the fuel supply source and the engine, comprising a strainer, a manual pump means, a relief valve, a unitary casing having within it appropriate chambers for receiving and passages for connecting the aforesaid elements, including a supply connection to the strainer and thence to the manual pump means, and a return connection whereby excess fuel is returned past the relief valve to such manual pump means, and including also two alternate discharge passages from said manual pump means, a by-pass valve also included within said casing and disposed in one of said discharge passages, opening under pressure to permit discharge from the manual pump means through such passage, a power pump means, the intake side of which is connected to the other of said manual pump discharge passages, and the discharge side of which is connected to the relief valve.

11. A fuel handling unit for airplanes, for interposition between a plurality of fuel supply sources and the engine, comprising a distributor valve, a manual pump means, a relief valve, a unitary casing having within it appropriate chambers for receiving and passages for connecting the aforesaid elements, including a supply connection from each supply source to the distributor valve and thence to the manual pump means, and a return connection whereby excess fuel is returned past said relief valve to the manual pump means, and including also two alternate discharge passages from said manual pump means, a by-pass valve also included within said casing and disposed in one of said discharge passages, opening under pressure to permit discharge from the manual pump means through such passage, a power pump means, the intake side of which is connected to the other of said manual pump discharge passages, and the discharge side of which is connected to the relief valve.

12. A fuel system unit comprising a housing, a hand pump in the central portion of said housing, power-driven pump also in said housing and fuel control means on said housing for admitting fuel both to the hand pump and the power-driven pump.

13. A fuel system unit comprising a housing, a hand-starting and emergency pump in the central portion thereof, a power-driven pump also in said housing, and a fuel control cock on said housing for admitting fuel both to the hand pump and the power-driven pump.

14. A fuel system unit comprising a housing, a hand-operated pump in the central portion thereof, a power-driven pump also in said housing, and a fuel control cock removably secured to the housing for admitting fuel both to the hand pump and the power-driven pump.

15. In a device of the character described, a pump, a pump housing having an inlet port and two discharge outlets, a branch passage leading from one discharge outlet to the other, a pressure operated valve in said passage, a return passage from said second discharge outlet to the inlet port, and a pressure operated valve in said return passage.

JOHN HARDING, Jr.